United States Patent Office 3,234,103
Patented Feb. 8, 1966

3,234,103
PRESSURE WATER-COOLED NUCLEAR REACTOR WITH IMPROVED WATER CIRCULATING SYSTEM
Olof Harald Vilhelm Lange, Malmo, Sweden, assignor to Aktiebolaget Atomenergi, Stockholm, Sweden, a company of Sweden
Filed July 29, 1963, Ser. No. 298,167
Claims priority, application Sweden, Aug. 2, 1962, 8,500/62
3 Claims. (Cl. 176—65)

This invention deals with a system for operating a pressurized water-cooled nuclear reactor, that is a reactor which is cooled with light or heavy water without any bulk steam generation. The heat from such a reactor is removed by water under high pressure and temperature in the primary cooling circuit. From the point of view of control bulk boiling in the reactor is to be avoided and thus the water heated up is allowed to pass through a heat exchanger on the secondary side of which steam is generated at a lower pressure and temperature than on the primary side.

The purpose of the invention is to attain a system in which the cooling water is heated up in the reactor core without boiling and in which steam will be generated without using an ordinary heat exchanger. A special object of the invention is to maintain hot water circulation between the reactor and the steam generator by installing the least possible pumping power—preferably none at all.

The characteristic of the invention is that water is discharged from the reactor at high pressure and temperature, the water pressure is decreased below initial saturation pressure in such a way that steam generation due to that pressure decrease increases the velocity of the steam-water mixture, the steam is separated from the water, a part of the kinetic energy of the water separated is converted into pressure head (energy) and said water then is returned to the reactor.

By recovering more or less of the kinetic energy of the water, it can be returned to the reactor with a reasonably limited pumping power. If the velocity of the steam-water mixture during steam generation is increased sufficiently the velocity of the separated water can be converted into pressure, which with small flow losses can be as high as or even higher than the pressure of the hot water before steam-generation. In the latter case water circulation from the reactor to a steam-generator can be maintained requiring no extraneous pumping power.

The water is separated from steam appropriately by the effect of centrifugal force on giving the steam-water mixture a rotating motion.

Referring to the accompanying drawing the invention will be explained in detail.

Figure 1:
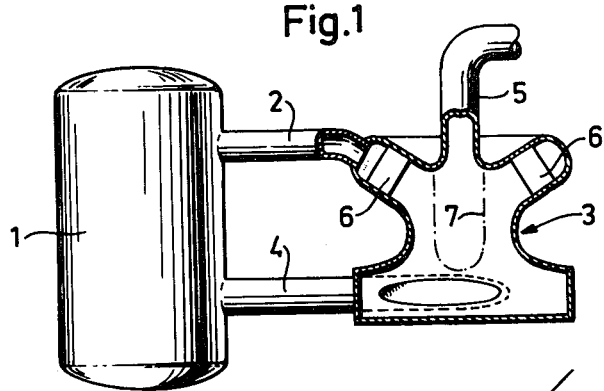
FIG. 1 shows a steam-generator in which the process can be performed.

FIG. 1 shows a nuclear reactor 1 from which water at high temperature and pressure is discharged through a pipe-line 2 to a steam-generator 3. In the upper part of the steam-generator there are inclined guide-vanes 6 arranged to impart a rotary motion to the water. In the zone of the guide-vanes the hot water velocity is increased partly because of a decreasing flow area and partly due to steam generation. Steam is separated in the centre well of the vortex which is formed in or close to the centre-line of the steam generator.

The steam is fed to a turbine through a pipe 5. From the bottom of the turbine there is a line 4 returning the water back to the nuclear reactor. As mentioned above, the decrease in pressure and the steam-generation results in an expansion of the steam-water mixture while flowing between the guide-vanes at the top of the steam-generator. Due to increase in volume of the steam-water mixture its velocity increases, and simultaneously it starts rotating. In the cylindrical middle region of the steam-generator the centrifugal force will produce a separation of steam from water. The steam leaves through pipe 5 while the water with a whirling motion continues towards the lower part of the steam-generator. Here the kinetic energy of the water is reconverted into pressure head. A frictionless process in the steam-generator is completely "self-sustaining," i.e., circulation in the system is maintained without pumps even in case of high pressure drop in the reactor and lines. To start the circulation, however, an auxiliary pump, not shown, is required.

Figure 2:
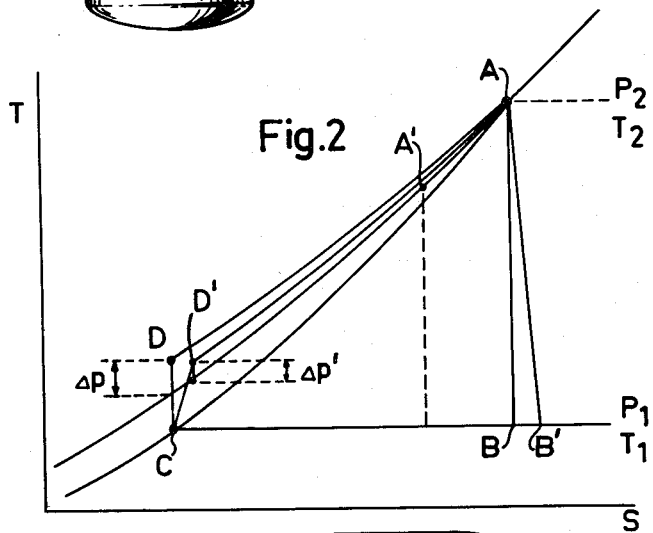
FIG. 2 shows a TS-diagram which illustrates the cycle in the device shown in FIG. 1.

The operation of the device as shown in FIG. 1 is illustrated in the TS-diagram of FIG. 2. Hot water entering the steam-generator has the pressure $P_2$. The temperature, if the water leaves the reactor at saturation temperature, is $T_2$ (point A). Assuming proper functioning, that is with minimum friction losses, the condition of the water at the entrance should correspond to some point to the left of A, e.g., $A^1$, that is the temperature is lower than $T_2$. Assuming expansion from point A in the guide-vanes free of losses the condition at point B is attained at exit of the guide-vanes. In reality the condition after expansion is represented by a point to the right of B, namely $B^1$.

Condensate is removed from the steam due to rotation during flow through the steam-generator so that the condition of the condensate corresponds to point C. This condition is valid at the surface of the vortex 7 formed in the steam-generator where the velocity of rotation is high. During downward movement through the steam-generator the condensate moves in a radial direction, resulting in kinetic energy being converted into pressure head. With frictionless flow at the exit of the steam-generator a condition is reached corresponding to a point over point C, e.g., D, which in turn corresponds to such a high pressure as is sufficient to overcome the frictional resistance in the nuclear reactor, including inlet and outlet pipelines. Actually the losses during compression however displaces the ultimate condition to point $D^1$. This point lies to the right of point D and the work gained from cycle $AB^1$ $CD^1$ A will be less. Consequently the pressure drop across the reactor, which can be overcome, will be less ($\Delta p'$ see FIG. 2). In case of major losses the pressure drop across the reactor cannot be overcome and therefore additional pumping power has to be taken account of.

Figure 3:
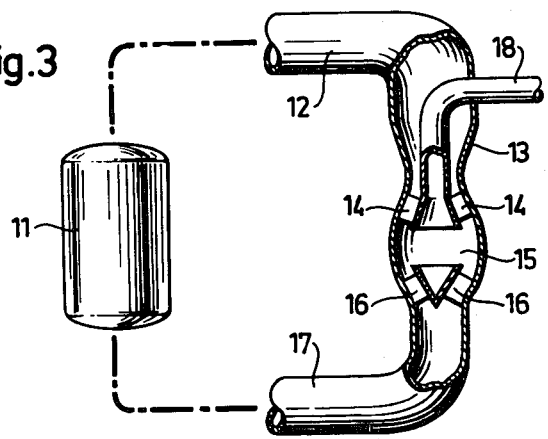
FIG. 3 shows an alternate design of a steam-generator in which the invention described can be processed.

The steam generator shown in FIG. 3 is an alternate design where flow direction deviates less from the perpendicule. Hot water from a nuclear reactor 11 is fed to a steam-generator through a line 12. Due to decrease in flow area in the restricted part of the passage 13 there is a rise in velocity with consequent steam-generation. In the vane assembly 14 the steam-water mixture is given a rotating motion, resulting in steam being separated from water in space 15. In the vaned diffusor 16 the rotating motion is counteracted under recompression. Steam is exhausted through pipe 18 and the water is returned to the reactor through pipe 17.

What is claimed is:
1. In combination, a water-cooled nuclear reactor and a device for circulating water through said reactor, said device comprising a vaporization chamber having an inlet for receiving highly heated water from the reactor and an outlet for returning the water to the reactor for renewed heating;

means for imparting a rotary motion to the water entering said vaporization chamber to create an annular rotating body of water and a central core of vaporized steam in said chamber;

means for withdrawing steam from said central core; and means for directing the water of said rotating body of water towards said outlet to convert the kinetic energy of said water into a pressure sufficient to return the water to the reactor.

2. In combination, a water-cooled nuclear reactor and a device for circulating water through said reactor, said device comprising a vaporization chamber;

means in the upper portion of said chamber for introducing highly heated water from the reactor tangentially into the vaporization chamber to create in the middle portion of the vaporization chamber a rotating annular body of water and a central core of vaporized steam;

means for withdrawing steam from said central core; and in the lower portion of said vaporization chamber an outlet for water to be returned to the reactor for renewed heating, said outlet being arranged tangentially so as to build up, when receiving water from the rotating annular body, a pressure sufficient to return the water to the reactor.

3. In combination, a water-cooled nuclear reactor and a device for circulating water through said reactor, said device comprising a vaporization chamber;

in the top of said vaporization chamber a central inlet for highly heated water from the reactor; in said vaporization chamber baffles for imparting a rotary motion to said heated water to create in the middle portion of the vaporization chamber an annular rotating body of body and a central core of vaporized steam;

means for withdrawing steam from said central core of steam;

a central outlet in the bottom of said vaporization chamber for returning water to the reactor for renewed heating; and baffles for transforming the rotary motion of said annular rotating body of water into a substantial axial flow into said central outlet to build up in said central outlet a pressure sufficient to return the water to the reactor.

References Cited by the Examiner

UNITED STATES PATENTS

| | | | |
|---|---|---|---|
| 2,806,820 | 9/1957 | Wigner | 176—54 |
| 2,998,363 | 8/1961 | Blaser | 176—56 |
| 3,034,975 | 5/1962 | Beutheret | 204—193.2 |
| 3,063,925 | 11/1962 | Huet | 204—193.2 |
| 3,070,537 | 12/1962 | Treshow | 204—193.2 |
| 3,074,874 | 1/1963 | Grenon et al. | 204—193.2 |

FOREIGN PATENTS 199,766 3/1958 Austria.

LEON D. ROSDOL, *Primary Examiner.*

CARL D. QUARFORTH, *Examiner.*

W. T. HOUGH, L. D. RUTLEDGE,
*Assistant Examiners.*